Oct. 19, 1937.　　　　N. P. WORDEN　　　　2,096,270
VEHICLE LAMP
Filed Feb. 25, 1935　　　2 Sheets-Sheet 1
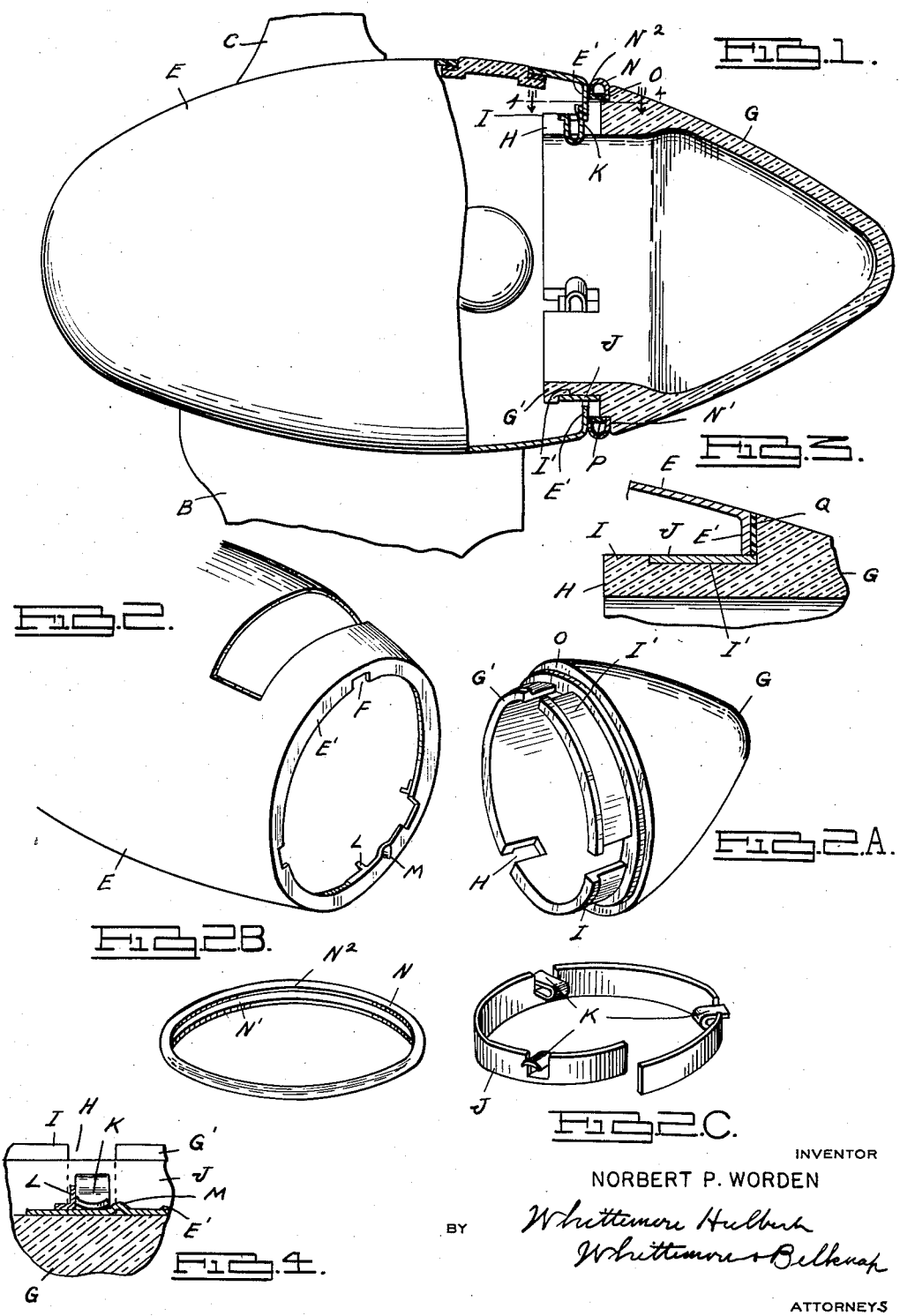
INVENTOR
NORBERT P. WORDEN
BY
ATTORNEYS

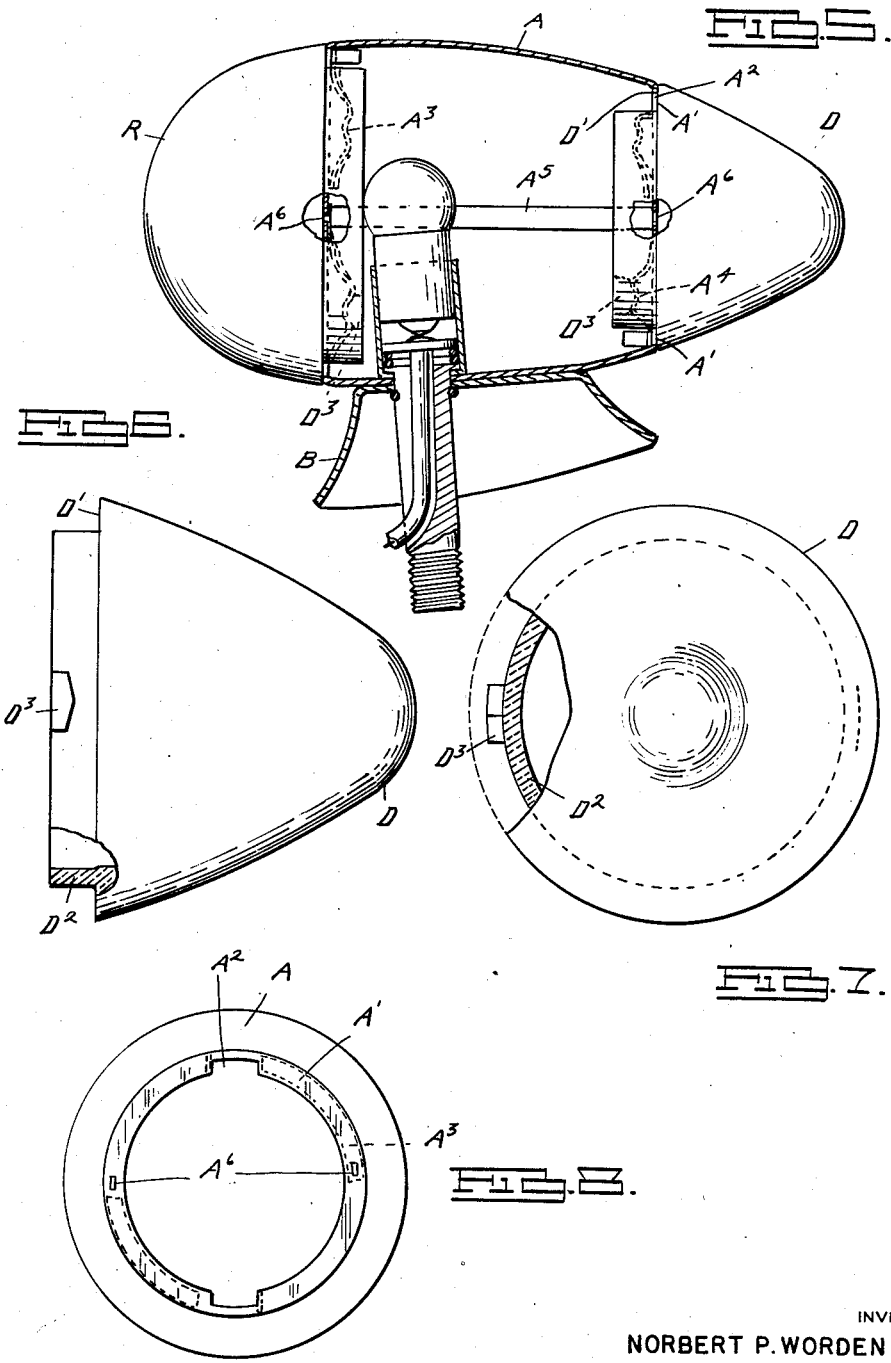

Patented Oct. 19, 1937

2,096,270

UNITED STATES PATENT OFFICE 2,096,270

VEHICLE LAMP

Norbert P. Worden, Detroit, Mich., assignor to C. M. Hall Lamp Company, Detroit, Mich., a corporation of Michigan Application February 25, 1935, Serial No. 8,112

10 Claims. (Cl. 240—41.55)

The invention relates to vehicle lamps and has for its object the obtaining of a construction in which the unmounted lens can be directly secured to the lamp housing so as to form a continuation of the outer surface thereof. In the present state of the art in motor vehicle construction there is a tendency towards streamlining, not only the body of the car but also all exposed accessories, such for instance as lamps. To facilitate such streamlining I have devised a construction in which the outer surface of the lens merges into the outer surface of the casing. The lens is then secured in such position by an integral portion thereof which projects within the casing and engages locking means therein. Where the light from the lamp is projected rearward, as in tail lights, the streamlining is preserved by providing a lens of substantially conical form, its outer surface forming a continuation of the rearwardly tapering form of the casing. Also for some uses, such as parking lights, it may be desirable to have the light projected both forward and rearward and to preserve the streamline form by properly fashioning the front and rear lens. The invention therefore consists in the novel construction as hereinafter set forth.

In the drawings:

Fig. 1 is a central longitudinal section through one form of lamp embodying my invention;

Figs. 2, 2A, 2B and 2C show respectively the casing lens and elements of the attachment means;

Fig. 3 is a section similar to a portion of Fig. 1 showing a slightly modified construction;

Fig. 4 is a section substantially on line 4—4, Fig. 1;

Fig. 5 is a sectional elevation of a lamp of modified construction;

Fig. 6 is a plan view of the rear lens;

Fig. 7 is a sectional elevation thereof;

Fig. 8 is an end elevation of the lamp casing.

In general construction my improved lamp comprises a lamp casing E which may be suitably mounted as by a supporting bracket B and may if desired have an upwardly projecting arm C for use in attachment of a license number. The lens is directly mounted on the casing so as to form a continuation of the outer surface thereof. It is secured in such position by an inwardly extending portion, preferably an annular flange having a laterally extending lug for engaging a locking shoulder within the casing.

As shown in Figs. 5, 6 and 7, the lens D has an annular shoulder D' for abutting against the end of the casing A and the inwardly extending annular flange $D^2$ provided on opposite sides thereof with outwardly extending lugs $D^3$, all of said parts being integral in construction. The lamp casing A is formed with a radially inwardly extending flange A' against which the shoulder D' abuts and within which the flange $D^2$ extends. This flange A' is cut away at $A^2$ for the passage of the lugs $D^3$ and on the inner face of the flange A' are arranged resiliently yielding seats $A^3$, preferably formed of fashioned segmental strips of spring metal. The construction is such that after the lugs $D^3$ have entered through the slots $A^2$ the lens may be turned to engage said lugs with the resilient seats $A^3$ which are provided with recesses $A^4$ for latching with the lugs. Thus the lens will be held in contact with the flange A' and its outer surface will merge into the surface of the lamp casing so as to preserve the streamline form.

The construction illustrated in Figs. 1 to 4 is similar to that just described, but instead of forming the locking lugs integral with the lens, they are formed of metal and attached to the inwardly extending annular flange by a surrounding metallic band. The lamp casing E has an inwardly extending flange E' cut away at F to form entrance slots and the lens G is provided with a flange G' adapted for insertion within the opening of the flange E'. This flange G' is interrupted at points H corresponding in position to the cut away portions F and is also provided with an outwardly extending rib I forming a peripheral groove I' between the same and the body portion of the lens. J is a split circular band of resilient metal adapted to be sprung into the groove I' with its edge bearing against the rib I. This band has a series of tongues K projecting radially outward therefrom and corresponding in relative position to the cutaway portions F and H. Preferably these tongues are formed integral with the band, being partly severed and struck inward therefrom and then return bent to extend radially outward. The construction is such that when the band is sprung upon the flange G' into the peripheral groove I' the return bend portions of the tongues K will extend through the slots or interruptions H in the flange G' and then outward to project radially beyond said flange. The resiliency is sufficient to cause the band to closely fit about the flange and the shouldered engagement with the rib I will hold the band from slipping off endwise. Thus by inserting the flange G' with the band thereon into the opening within the flange E' of the casing, the tongues K will pass through slots or cutaway portions F and by then turning the lens the tongues will be moved out of registration with said slots into locking engagement with the flange E'. To hold the parts in this position, the flange E' has formed on its inner side a plurality of stops L which prevent further turning of the lens and spaced from these stops a distance substantially equal to the width of the tongue are indentations M in the flange E' which resist rotation of the lens in the reverse direction. The projecting portions of the tongues K are slightly rounded to facilitate riding over the indentations M when the lens is being engaged or disengaged and the resiliency of the tongues K is sufficient to prevent such movement accidentally.

For ornament it is sometimes desired to place a bright band intermediate the lens and the casing. Such a band N can be placed around the lens which latter is preferably formed with a peripheral groove O for receiving the band. As shown, the band N is of a substantially U-shaped cross section, one leg N' being longer than the other and fitting against the bottom of the groove O, while the other leg N² bears against the flange E' of the casing. A resilient gasket P is also preferably placed within the band N so as to form a weatherproof seal when the lens is locked to the casing.

Where it is not desired to have the band N, the construction is such as illustrated in Fig. 3, the lens being separated from the flange E' only by a gasket Q.

With the construction as described, the locking stress is carried by the resilient tongues K and distributed through the band J to the rib I on the flange G'. This will prevent any localization of stresses sufficient to endanger the breaking of any part of the glass structure.

With the construction shown in Fig. 5, which is designed as a parking light, there is not only the rear lens D but also a front lens R. This is similar to the lens D in the construction of its securing means, but is of different external contour to preserve the streamline form. With all of the constructions illustrated, the joint between the lens and the casing is sealed and weatherproofed by a resilient gasket such as P and Q and the resilient member of the locking means will place this gasket under sufficient compression for effective sealing.

To secure the resilient seats A³ to the flanges A' without interrupting the smooth seating surface for the lens, I preferably employ a longitudinal strip A⁵ extending adjacent to the inner wall of the lamp casing and having at its opposite ends pintles A⁶, one of which engages registering apertures in the seat A³ and flange A' and the other an aperture in the opposite flange A'. This construction permits of quickly assembling the parts without the use of rivets or without interrupting the seating surface.

What I claim as my invention is:

1. The combination with a lamp casing and a lens forming a streamlined extension thereof, of means for securing said lens to said casing comprising a flange integral and coaxial with said lens insertable within said casing, a metallic band encircling said flange, fasteners projecting radially from said band and cooperative means on said casing for interlocking engagement with said fasteners.

2. The combination with a lamp casing and a lens forming a streamlined extension thereof, of means for securing said lens to said casing comprising a flange coaxial and integral with said lens and having a peripheral groove therein, said flange being insertable within said casing, a metallic band embracing said flange within said groove, fasteners projecting from said band and cooperating means within said casing with which said fasteners have an interlocking engagement.

3. The combination with a lamp casing and a lens forming a streamlined extension thereof, of means for securing said lens to said casing comprising an interrupted circular flange coaxial and integral with said lens, a metallic band encircling and having a shouldered engagement with said flange, a fastener integral with said band located in the space between segments of said flange, and cooperative means within said lamp casing with which said fastener has an interlocking engagement.

4. The combination with a lamp casing and a lens, of means for securing said lens to said casing comprising a circular flange integral and coaxial with said lens, said flange being insertable within said casing and having a peripheral groove, a metallic band of resilient material having a snap engagement with the groove in said flange, a fastener projecting radially outward from said band and means within said casing with which said fastener has an interlocking engagement.

5. The combination with a lamp casing and a lens, of means for securing said lens to said casing comprising an interrupted circular flange integral with said lens and insertable within said casing, said flange having a peripheral groove therein, a band of resilient material having a snap engagement with said groove, a fastener integral with said band having a radially inwardly extending portion, a return bend and a radially outwardly extending portion, said portions being located in the space between segments of said flange, and a flange on said casing radially slotted for the passage of said fastener and cooperating therewith upon the rotation of said lens to lock the same to said casing.

6. The combination with a lamp casing and a lens, of means for securing said lens to said casing comprising an integral flange projecting from said lens and formed of a series of circular segments spaced from each other, said segments having a peripheral groove therein, a metallic band of resilient material having a snap engagement with the groove of said segments, a plurality of tongues integral with said band and having a radially inwardly extending portion, a return bend and a radially outwardly extending portion projecting beyond said band, said tongues registering respectively with the spaces between said segments to pass therethrough and means within said casing for interlocking with said tongues upon a rotative adjustment of said lens.

7. The combination with a lamp casing and a lens, of means for securing said lens to said casing comprising an inwardly extending annular flange on said casing having a plurality of radial slots therein, an integral flange projecting from said lens and formed of a series of circular segments spaced from each other, said flange being insertable within said casing and the spaces between segments being registrable with the radial slots in the flange on said casing, a metallic band encircling the flange on said lens and having a shoulder engagement therewith, and tongues integral with said band and registering with the spaces between said segments, said tongues having an inwardly extending portion, a return bend and an outwardly projecting portion extending beyond the band whereby said outwardly projecting portions may be inserted through the slots in the flange on said casing and locked with said flange by a rotation of the lens.

8. The combination with a lamp casing and a lens forming complementary portions of a streamline form, of means for securing said lens to said casing comprising a flange integral with said lens and insertable within said casing, a metallic band having a snap engagement with said flange, a fastener on said band projecting radially outward therefrom and cooperating means on said casing with which said fastener has an interlocking engagement.

9. The combination with a lamp casing and a lens forming complementary portions of a streamline form, of means for securing said lens to said casing comprising a flange integral with said lens formed of a series of circular segments insertable within said casing, said segments having a peripheral groove therein, a band of resilient metal having a snap engagement with the groove in said segments, said band having tongues integral therewith, each with a radially inwardly extending portion, a return bend and a radially outwardly extending portion, said tongues registering with and engaging the spaces between segments of said flange to be held thereby from independent rotative movement, and a flange on said casing radially slotted for the passage of said tongues and cooperating therewith upon the rotation of said lens to lock the same to the casing.

10. The combination with a lamp casing and a lens forming complementary portions of a streamline form, of a flange integral with said lens projecting inward into said casing, a metallic band encircling said flange and having a shouldered engagement therewith, a fastener projecting radially from said band, cooperating means within said casing for interlocking with said fastener upon the rotation of said lens, and an ornamental band arranged in a peripheral groove in said lens adjacent to said casing.

NORBERT P. WORDEN.